(12) United States Patent
Vazquez (10) Patent No.: US 8,281,818 B1
(45) Date of Patent: Oct. 9, 2012

(54) SYSTEMS AND METHODS FOR GAUGING AND CONTROLLING FLUIDS AND GASES FROM PIPES AND ORIFICES

(76) Inventor: David Vazquez, Riverside, CA (US)

( * ) Notice: Subject to any disclaimer, the term of this patent is extended or adjusted under 35 U.S.C. 154(b) by 1304 days.

(21) Appl. No.: 11/674,582

(22) Filed: Feb. 13, 2007

Related U.S. Application Data (60) Provisional application No. 60/773,541, filed on Feb. 15, 2006.

(51) Int. Cl.
*F16L 55/10* (2006.01)
(52) U.S. Cl. ............................................ 138/90; 138/89
(58) Field of Classification Search .................... 138/89, 138/90
See application file for complete search history.

(56) References Cited

U.S. PATENT DOCUMENTS

| | | | | |
|---|---|---|---|---|
| 1,808,411 A * | 6/1931 | Hinkston | ...................... | 220/236 |
| 1,860,855 A | 5/1932 | Gardner | | |
| 2,375,995 A * | 5/1945 | Kaeser | ........................... | 220/236 |
| 2,475,748 A * | 7/1949 | Leroy | ............................... | 138/90 |
| 2,824,577 A * | 2/1958 | Grunsky | ......................... | 138/90 |
| 3,105,521 A * | 10/1963 | Edwards | ......................... | 138/90 |
| 3,395,601 A * | 8/1968 | Miller | ........................... | 411/435 |
| 3,473,555 A * | 10/1969 | Martin et al. | ............. | 137/315.42 |
| 3,498,647 A * | 3/1970 | Schroder | ........................ | 285/343 |
| 3,541,858 A * | 11/1970 | Bonczek | ......................... | 73/747 |
| 3,542,076 A * | 11/1970 | Richardson | .................... | 138/89 |
| 3,607,361 A | 9/1971 | Hight | | |
| 3,704,729 A * | 12/1972 | Tomlinson | ....................... | 138/90 |
| 4,155,373 A | 5/1979 | DiGiovanni | | |
| 4,385,643 A * | 5/1983 | Noe | ................................. | 138/90 |
| 5,152,311 A | 10/1992 | McCreary | | |
| 5,205,358 A | 4/1993 | Mitzlaff | | |
| 5,224,516 A | 7/1993 | McGovern et al. | | |
| 5,524,661 A | 6/1996 | Tigerholm | | |
| 5,592,965 A | 1/1997 | Rakieski | | |
| 5,651,393 A | 7/1997 | Danowski | | |
| 5,819,804 A | 10/1998 | Ferrer et al. | | |
| 5,967,191 A | 10/1999 | Mummolo | | |
| 6,035,898 A * | 3/2000 | Dominguez | .................... | 138/89 |

(Continued)

OTHER PUBLICATIONS

Flo-Thru Jet Swet Single Tools, Brenelle Enterprises, Inc., http://www.brenelle.com/floprod.htm downloaded Jun. 13, 2007.

(Continued)

*Primary Examiner* — James Hook
(74) *Attorney, Agent, or Firm* — Knobbe Martens Olson & Bear LLP (57) ABSTRACT

A sealing apparatus is disclosed. In some embodiments, the sealing apparatus includes a shaft assembly that couples a laterally expandable plug and a longitudinally expandable member. The plug and the expandable member are captured within the ends of the shaft assembly. The shaft assembly is configures so that longitudinal expansion of the expandable member results in lateral expansion of the plug. Thus, such a device can be inserted into a pipe and the plug can be expanded within the pipe to provide a seal about the shaft assembly. In some embodiments, the shaft assembly can define a longitudinally extending hollow pathway that allows flow between the two ends of the shaft assembly. Examples of how such hollow pathway and the plug operation can be implemented are disclosed. Example applications, such as pressure measurements, are also disclosed.

30 Claims, 10 Drawing Sheets

U.S. PATENT DOCUMENTS

| | | |
|---|---|---|
| 6,257,266 B1 | 7/2001 | Valdez |
| 6,263,896 B1 | 7/2001 | Williams |
| 6,273,644 B1 * | 8/2001 | Konwinski et al. ........... 405/184 |
| 6,508,267 B1 | 1/2003 | Rippolone |
| 6,581,620 B2 | 6/2003 | Babcock et al. |
| 6,755,216 B1 * | 6/2004 | Mostala ........................ 138/98 |
| 6,820,636 B1 | 11/2004 | Kien |
| 6,901,966 B2 | 6/2005 | Onuki et al. |
| 2004/0074549 A1 | 4/2004 | Allen |
| 2005/0189027 A1 | 9/2005 | Markham |
| 2006/0137753 A1 | 6/2006 | Peterson |

OTHER PUBLICATIONS

"Jet Swet" product brochure, by Brenelle Ent. Inc., 2005 Brenelle Ent. Inc.

"Jet Swets: The Legacy of 'Soldering with Water in the Line;'" 2006 Manufacturer's Spotlight, *Reeves Journal*, Jul. 2006.

"Jet Swet", by Brenelle Ent. Inc., No. 181 on Reader Action Card, *Reeves Journal*, vol. 86, No. 12, Dec. 2006.

Instruction Sheet for Jet Swet, Brenelle, Ent. Inc., 2005.

Instruction Sheet, Water-Gate Water Shut-off Tool, Mill-Rose, Clean-Fit Products.

* cited by examiner

SYSTEMS AND METHODS FOR GAUGING AND CONTROLLING FLUIDS AND GASES FROM PIPES AND ORIFICES

PRIORITY CLAIM

This application claims priority benefit of U.S. Provisional Patent Application No. 60/773,541 filed Feb. 15, 2006, titled "SYSTEMS AND METHODS FOR GAUGING AND CONTROLLING FLUIDS AND GASES FROM PIPES AND ORIFICES," which is incorporated herein by reference in its entirety.

BACKGROUND

1. Field

The present disclosure generally relates to tools, and more particularly, to apparatus and method for a device that allows gauging and controlling of fluids and gases from pipes and orifices.

2. Description of the Related Art

In many situations such as plumbing applications, pipes and orifices need to be in a condition that allows work to be performed in a safe and efficient manner. For example, when working on a water pipe, water may need to be kept away from the portion of the pipe being worked on. To achieve such a condition, water may be shut off completely. Typically, such shutting off of water can affect an entire building or house; and thus is not desirable if the work is to be lengthy.

In certain plumbing and gas applications, the pipe may be plugged near the portion being worked on. In such situations, the remainder of the system may be pressurized. Because of such pressurization, a worker working on the pipe may be subjected to a hazardous condition.

SUMMARY

In some embodiments, the present disclosure relates to a device that includes a shaft assembly having first and second ends, and defining a hollow interior pathway between the first and second ends. The device further includes a plug assembly disposed adjacent the first end of the shaft assembly and comprising a laterally expandable member configured to expand laterally about a longitudinal axis of the shaft assembly when compressed longitudinally. The device further includes a longitudinal expansion assembly disposed adjacent the second end of the shaft assembly and configured to expand longitudinally. The device further includes a longitudinal coupling member disposed between the longitudinal assembly and the plug assembly such that when the longitudinal expansion assembly expands, longitudinal coupling member transfers a longitudinal force due to expansion to the plug assembly to provide the longitudinal compression for the laterally expandable member.

In one embodiment, the shaft assembly comprises a hollow tube having circular cross-sectional shape with an outer diameter and an inner diameter. In one embodiment, the laterally expandable member comprises a cylindrically shaped member having a longitudinally extending aperture with a diameter selected to fit over the outer diameter of the hollow tube and provide sealing functionality between the hollow tube and the outer perimeter of the cylindrically shaped member. In one embodiment, the plug assembly further comprises first and second disks disposed on first and second ends of the cylindrically shaped member, with each of the first and second disks defining an aperture dimensioned to fit over the hollow tube and capture the cylindrically shaped member so as to facilitate compression of the cylindrically shaped member.

In one embodiment, the shaft assembly is configured to prevent longitudinal movement of the plug assembly beyond the first end of the shaft assembly. In one embodiment, the shaft assembly defines a flare at or near its first end, the flare dimensioned to prevent the longitudinal movement of the plug assembly. In one embodiment, the shaft assembly includes a removable nut mounted at or near the first end of the shaft assembly, the nut dimensioned to prevent the longitudinal movement of the plug assembly.

In one embodiment, the longitudinal expansion assembly is dimensioned to fit over the outer diameter of the hollow tube and between the longitudinal coupling member and a location at or near the second end of the hollow tube. In one embodiment, the longitudinal expansion assembly comprises first and second members having respective longitudinally extending apertures with diameters selected to fit over the hollow tube. The first and second members are configured to operate in cooperation to allow longitudinal expansion of the longitudinal expansion assembly. In one embodiment, the first member includes a hollow shaft portion having external threads, and the second member includes hollow receiving portion having internal threads dimensioned to receive the external threads of the first member, such that relative rotation of the first and second members results in longitudinal expansion or contraction of the longitudinal expansion assembly.

In one embodiment, the first member comprises a screw. In one embodiment, the screw includes a head dimensioned to be received by a wrench to facilitate the relative rotation of the first and second members. In one embodiment, the head of the screw has a hexagonal cross-sectional shape.

In one embodiment, the second member comprises a nut. In one embodiment, the nut includes a head dimensioned to be received by a wrench to facilitate the relative rotation of the first and second members. In one embodiment, the head of the nut has a hexagonal cross-sectional shape.

In one embodiment, the shaft assembly is configured to prevent longitudinal movement of the longitudinal expansion assembly beyond the second end of the shaft assembly. In one embodiment, the shaft assembly defines a flare at or near its second end, with the flare dimensioned to prevent the longitudinal movement of the longitudinal expansion assembly. In one embodiment, the shaft assembly includes a removable cap member mounted at or near the second end of the shaft assembly, with the cap member dimensioned to prevent the longitudinal movement of the longitudinal expansion assembly. In one embodiment, the second end of the hollow tube includes internal threads, and the cap member includes a threaded portion dimensioned to be received by the internal threads of the second end of the hollow tube, with the cap member further comprising a flange having a diameter selected to prevent the longitudinal movement of the longitudinal expansion assembly. In one embodiment, the cap member defines a hollow interior to allow passage of fluid or gas from or to the interior of the hollow tube. In one embodiment, the flange diameter is selected so as to allow attachment of an end device to the longitudinal expansion assembly. In one embodiment, the longitudinal expansion assembly includes a hollow shaft portion at or near the second end of the hollow tube. The hollow shaft portion can have an outer diameter that is substantially the same as the flange diameter. The hollow shaft portion can have external threads to allow attachment of the end device over the cap member. In one embodiment, the end device comprises a cap nut having internal threads dimensioned to receive the external threads of the hollow shaft portion. In one embodiment, the cap nut is dimensioned to allow positioning of an O-ring that engages the flange of the cap member to provide sealing of the interior of the hollow tube. In one embodiment, the end device comprises a quick-detachable coupler that facilitates coupling to an external device. In one embodiment, the quick-detachable coupler is configured to facilitate coupling of the external device to the longitudinal expansion assembly.

In one embodiment, the laterally expandable member is dimensioned and formed from a selected material so that when in its uncompressed state, the laterally expandable member is insertable into an interior of a pipe or an orifice, and when in its compressed state, the expanded dimension is such that the laterally expandable member provides a seal between the inner wall of the pipe or orifice and the shaft assembly.

In one embodiment, the longitudinal coupling member comprises an outer hollow tube having an inner diameter that allows the outer hollow tube to fit over and move longitudinally relative to the shaft assembly.

In some embodiments, the present disclosure relates to an apparatus for controlling fluids or gases from pipes or orifices. The apparatus includes a plug member configured to expand and contract, where the plug member in the expanded configuration engages the interior of a pipe or orifice. The apparatus further includes a shaft assembly configured to facilitate the expansion and contraction of the plug member. The shaft assembly includes a conduit member defining a hollow interior and having first and second ends, such that the first end extends through the plug member so as to allow flow of fluid or gas from the first end to the second end even if the plug member is in the expanded configuration. The apparatus further includes an end assembly disposed at or about the second end of the conduit member, and configured to allow either capping of the second end to inhibit flow or attaching of a gauge for measuring at least one condition of the fluid or gas in the interior of the pipe or orifice.

BRIEF DESCRIPTION OF THE DRAWINGS

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

The present disclosure generally relates to various embodiments of apparatus and method for controlling fluids and gases from pipes and orifices. In some embodiments, such apparatus can be configured to allow sealing of pipes and orifices and/or controlling of pressurized conditions of such pipes and orifices. In some embodiments, such apparatus can be fitted with a gauge to measure fluid/gas parameters such as pressure or temperature. Such a gauge can be used, for example, to safely determine a pressure and/or temperature condition of the interior of the pipe or orifice before the apparatus is adjusted to allow flow of fluid or gas.

An example application of the present disclosure can occur in a plumbing industry for testing and/or repair of fluid and gas lines. The example plumbing industry may periodically test and determine liquid or gas pressure of supply lines. A service line in the plumbing industry generally includes gas or fluid lines that have a valve and/or tee and/or cavity from which pressure and/or other measurements can be made. In cases of temperature and/or pressure, dangerous conditions can arise, especially if the service personnel is unaware of the condition inside the service line.

One or more features of the present disclosure can safely allow for testing of pressure and/or temperature in the example plumbing application, before or during testing or repair of the service line. In cases of temperature, one or more features of the present disclosure can allow the technician to verify or insure that temperature is distributed substantially equally within an existing or new system. Three non-limiting example types of pressurized system used in the plumbing industry can include: air pressure for testing of leaks in plumbing lines, low pressure gas where the line is be tested to verify or insure no loss of gas in the system, and hot water where testing of the transfer of heat is verified or insured when sizing lines within hot water systems.

In testing for leakage, lines can be pressurized to verify or insure that pipe joints are sealed before testing with fluid. One or more features of the present disclosure can allow for an attachment that can allow the lines to be pressurized and then have a gauge that can determine loss of pressure normally associated with leakage.

With low pressure gas, one or more features of the present disclosure can allow for testing of gas lines over an extended period of time which allows for the ability of threaded connection to be tested for leakage without the requirement of having a stationary gauge at all sections to be tested.

For hot water systems, one or more features of the present disclosure can allow for testing of temperature of fluid as it pertains to heated liquids from remote locations. One or more features of the present disclosure can allow for testing temperature from remote locations and/or sections of supply lines, therefore determining time and heat to remote location.

One or more features of the present disclosure may also be used to replace faulty valves. One embodiment of an apparatus of the present disclosure can be inserted through the valve and seal the internal diameter of the line, to thereby facilitate the replacement of the valve by determining if line is pressurized before removal of the apparatus.

Figure 1A:
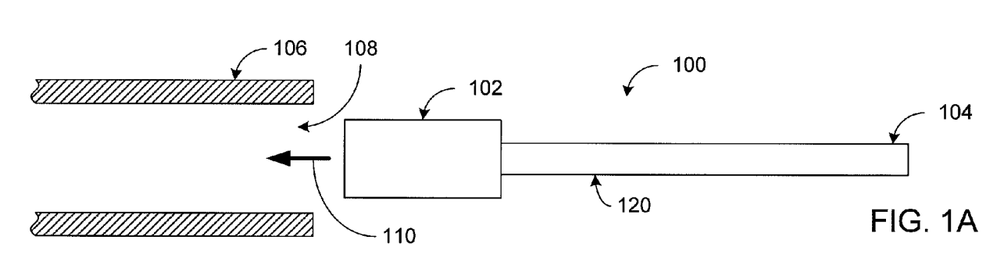
FIG. 1A shows one embodiment of a sealing device configured to allow insertion into a pipe or an orifice so as to allow plugging of, or controlling flow associated with, the pipe or orifice.

FIG. 1A shows that in some embodiments, a sealing device 100 that can be inserted (depicted as an arrow 110) into an opening 108 of a pipe 106 or an orifice to seal and perform various example functions described herein. The sealing device 100 is shown to have a plug end 102 interconnected to a cap end 104 by a shaft assembly 120. Example embodiments of the plug end 102, cap end 104, and the shaft assembly 120 are described below in greater detail.

For the purpose of description, it will be understood that "cap end" can include an end assembly configured to maintain a closed or substantially closed system with respect to the inside of the pipe or orifice. "Cap end" can also include an end assembly configured to allow coupling with devices such as measurement devices and/or gas/fluid lines.

Figure 1B:
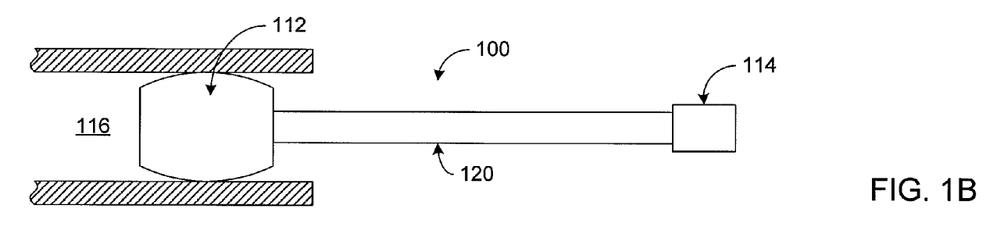
FIG. 1B shows one embodiment of the sealing device of FIG. 1A configured to allow plugging of the pipe or orifice.

FIG. 1B shows the sealing device 100 inserted into an interior space 116 defined by the example pipe 106. The plug end 102 is shown to be in an expanded configuration 112 so as to substantially seal the interior space 116 from the exterior.

In some embodiments, the shaft assembly 120 can be configured to facilitate the expansion of the plug end 102. The shaft assembly 120 can also be configured to allow flow of liquid or gas from the interior space 116 to the cap end 104. Thus, in one embodiment, the cap end 104 can be configured to receive a bleeder cap 114 to inhibit the liquid or gas from escaping or entering the interior space. In such a configuration, the sealing device 100 can provide a functionality of sealing the interior space 116 from the outside.

Figure 1C:
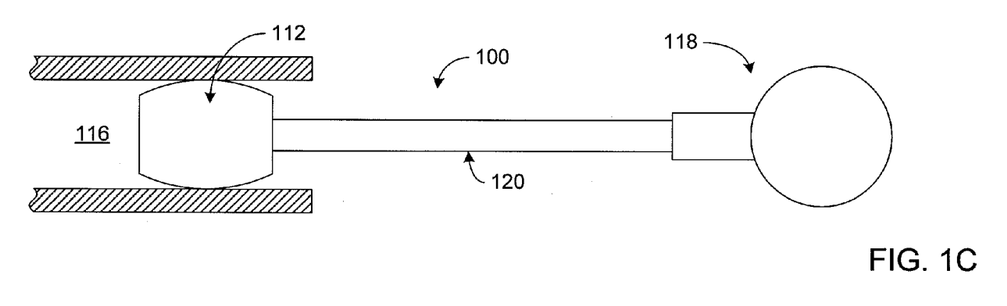
FIG. 1C shows that in one embodiment, the sealing device can be coupled to a gauge to measure pressure, temperature, or other parameters associated with the interior of the pipe or orifice.

FIG. 1C shows the sealing device 100 in the example sealed configuration as described in FIG. 1B. In one embodiment, the cap end 104 can be configured to receive a gauge 118 for measuring parameters such as pressure or temperature associated with the interior space 116. In one embodiment, the gauge 118 replaces the bleeder cap 114 of FIG. 1B. In other embodiments, the functionalities of capping and/or gauge-coupling can be achieved by various known techniques.

Figure 2A:
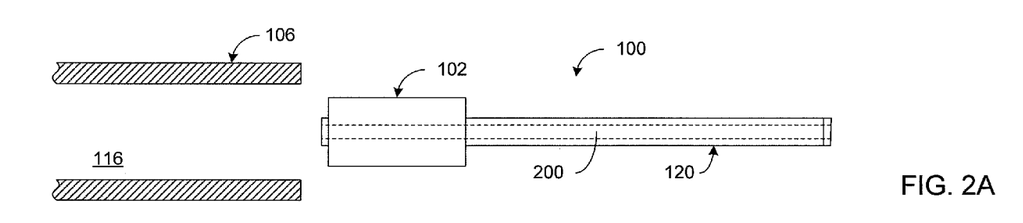
FIGS. 2A-2D show an example application of one embodiment of the sealing device.

FIGS. 2A-2D show that in some embodiments, the sealing device 100 can include a hollow path that extends from the plug end 102 to the cap end 204. FIG. 2A shows the sealing device 100 with its plug end 102 in a non-expanded configuration so as to allow insertion into the example inner space 116 defined by the example pipe 106.

Figure 2B:
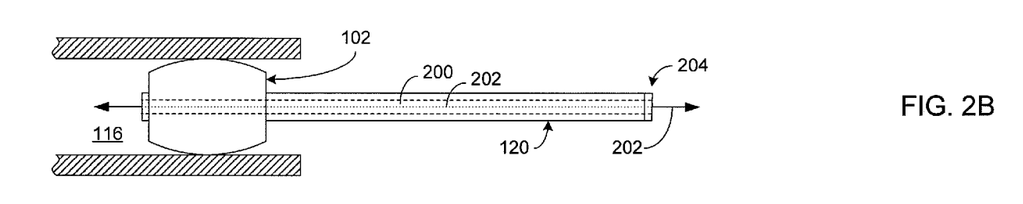

FIG. 2B shows the plug end 102 inserted into the inner space 116 and expanded so as to inhibit flow of fluid or gas via the area around the shaft assembly 120. In the example embodiment shown in FIG. 2B, however, flow can occur (depicted as an arrow 202) through the hollow path 200. In the example configuration of FIG. 2B, the cap end 204 is depicted as not being capped. Thus, flow can occur between the interior space 116 and the exterior through the hollow path 200.

Figure 2C:
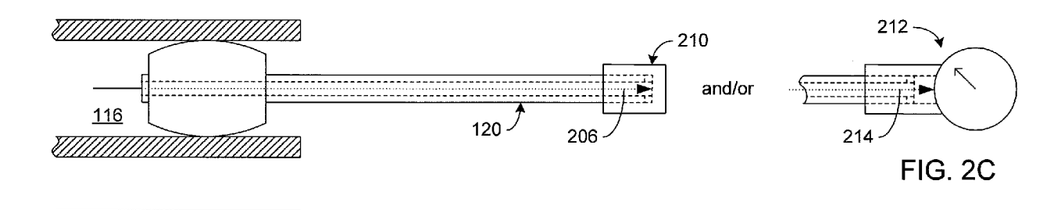

FIG. 2C shows that in some embodiments, the cap end 204 be capped by a cap 210 such as a bleeder cap, and/or be fitted with a measurement apparatus 212 such as a gauge. In some embodiments, the functionality of capping and gauging can be combined. When the cap 210 is used, the flow can be inhibited from going past the cap 210 (as depicted by an arrow 206). When the gauge 212 is used, the flow can be directed into the gauge (as depicted by an arrow 214). Thus, in the example configuration of FIG. 2C, the interior space 116 can be substantially sealed from outside of the pipe 106.

Figure 2D:
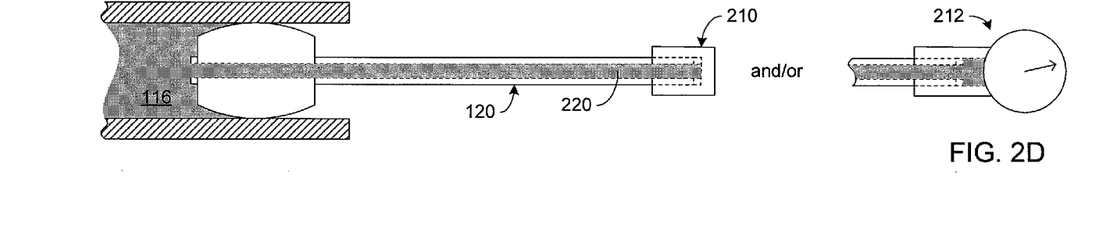

FIG. 2D shows an example configuration where the interior of the pipe 106 is pressurized (depicted as shadowed region 220) relative to the outside. Such pressurized fluid or gas is shown to occupy or flow through the hollow path 200 to be stopped by the cap 210 and/or the gauge 212.

Figures 3, 4:
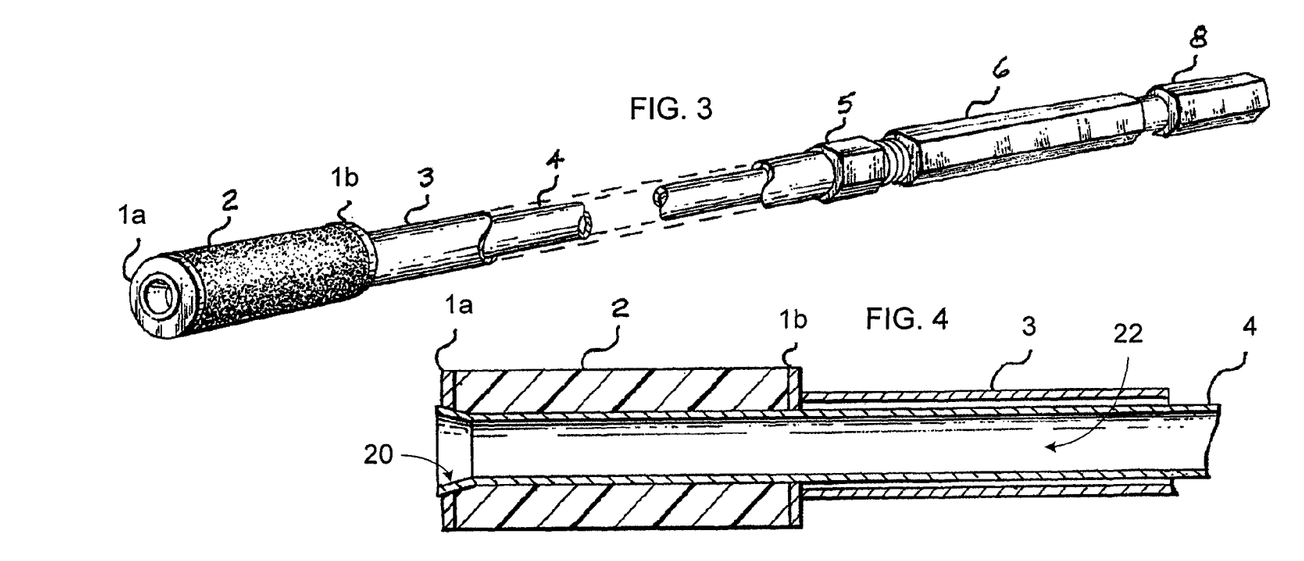
FIG. 3 shows an isometric view of one embodiment of the sealing device having a plug end and a cap end.
FIG. 4 shows a sectional view of one embodiment of the plug end, showing a flair connection holding first and second orbital disks with a rubber membrane positioned therebetween, and a fluid tube running through a hollow shaft.
Figure 5:
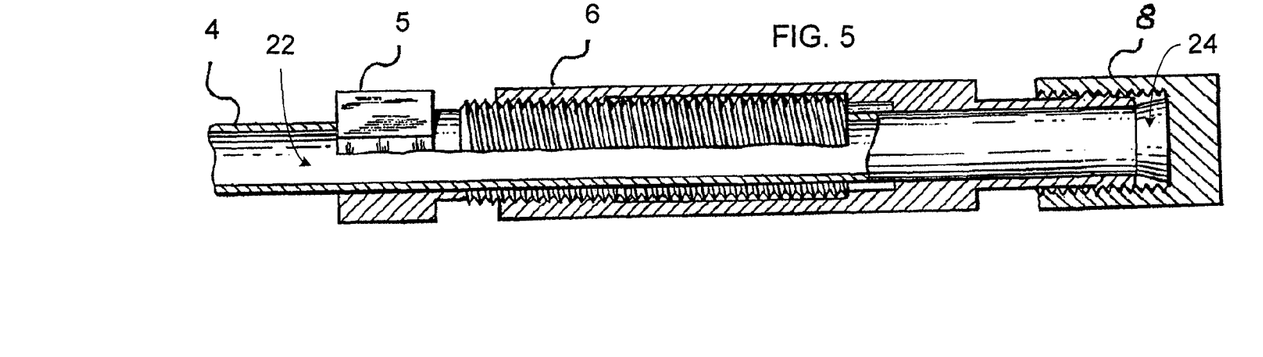
FIG. 5 shows a sectional view of one embodiment of the cap end, showing an adjusting screw and nut, and a flare connection that can be capped by a bleeder cap.

Various non-limiting example configurations are described hereinbelow. FIG. 3 shows one embodiment of the sealing device having a plug end (102 in FIG. 1A) and a cap end (104 in FIG. 1A) that is coupled by a shaft assembly (120 in FIG. 1A). FIG. 4 shows a sectional view of the plug end and a portion of the shaft assembly. FIG. 5 shows a sectional view of the cap end and a portion of the shaft assembly.

As shown, the shaft assembly includes an inner shaft 4 that extends through an outer shaft 3. In one embodiment, the inner and outer shafts 4 and 3 can be generally co-axial. In one embodiment, the inner shaft 4 can be hollow so as to allow passage of fluid or gas between the plug end and the cap end.

In one embodiment, the outer shaft 3 includes a first end adjacent the plug end, and a second end adjacent or towards the cap end. The outer shaft 3 can be configured to move along its longitudinal axis relative to the inner shaft 4 so as to expand the plug end. Examples of such relative movement and the resulting expansion are described below in greater detail.

In one embodiment, as shown in FIGS. 3 and 5, the second end of the outer shaft 3 is shown to engage a second end of the inner shaft 4 via an expandable assembly that includes a screw 5 and a nut 6. In one embodiment, the second end of the inner shaft 4 can be configured so as to inhibit movement of the nut 6 beyond the second end, such that expansion of the expandable assembly results in movement of the first end of the outer shaft 3 towards the plug end. As shown in FIGS. 3 and 4, the first end of the inner shaft 4 can be configured to inhibit movement of the plug assembly beyond the first end. Thus, the movement of the outer shaft 3 relative to the inner shaft 4 due to the expansion of the expandable assembly results in the plug assembly being squeezed and expanded to provide the sealing functionality.

In one embodiment, as shown in FIGS. 3 and 4, the first end of the outer shaft 3 is shown to engage a portion of the plug assembly. As described below in greater detail, as the outer shaft 3 moves, the plug assembly can be pressed by the first end of the outer shaft 3, thereby resulting in a transverse expansion of the plug end. When such transverse expansion occurs within a pipe or an orifice, the plug assembly can inhibit flow of fluid or gas about the outer shaft 3 (see the example expanded configuration 112 in FIG. 1A).

In one embodiment, as shown in FIGS. 3 and 4, the plug assembly can include first and second disks 1a and 1b with an expandable membrane 2 therebetween. The first and second disks 1a and 1b, as well as the membrane 2 are shown to define apertures dimensioned to fit over the inner shaft 4. In one embodiment, the first end of the inner shaft 4 can define a flare 20, and the aperture on the first disk 1a can be dimensioned smaller than the diameter of a flare 20, such that the flare 20 inhibits movement of the first disk 1a past the flare 20. Thus, as the outer shaft pushes on the second disk 1b (towards the first disk 1a), the membrane 2 becomes compressed longitudinally, resulting in the transverse expansion. As described herein, other configurations are possible for preventing movement of the plug assembly beyond the first end of the inner shaft 4.

In some embodiments, the first and second disks 1a and 1b can be formed from metals such as stainless steel. The membrane 2 can be formed from compressible materials such as polyisoprene. Various different materials and dimensions can be implemented, depending on different applications of the sealing device.

In one embodiment, as shown in FIGS. 3 and 5, the second end of the outer shaft 3 can be configured to allow movement of the outer shaft 3 relative to the inner shaft 4. As described above, when such longitudinal expansion occurs, the second end of the outer shaft 3 is inhibited from moving past beyond the second end of the inner shaft 4. In one embodiment, the second end of the inner shaft 4 defines a flare 24, where the diameter of the flare 24 is larger than the inner diameter of the nut 6. Thus, as the nut 6 engages the flare 24, the nut 6 is inhibited from moving past the flare 24. As described herein, other configurations are possible for preventing movement of the nut 6 beyond the second end of the inner shaft 4.

In some embodiments, as shown in FIGS. 3 and 5, the expandable assembly can include a hollow adjusting screw 5 that fits over the inner shaft 4, and a corresponding nut 6 that receives the screw 5 on one end and abuts against the flared end 24 on the other end. Thus, relative turning of the screw 5 and/or nut 6 can result in the second end of the outer shaft 3 either expanding or contracting longitudinally, thereby allowing the membrane 2 to either expand or contract transversally.

In some embodiments, the inner and outer shafts 4 and 3, and the adjusting screw 5 and the adjusting nut 6, can be formed metals such as stainless steel or brass. Various different materials and dimensions can be implemented, depending on different applications of the sealing device.

In some embodiments, the inner shaft 4 can define a hollow interior space 22 that extends between the first and second ends of the inner shaft 4. Thus, even if the membrane 2 is in the expanded configuration (for example, 112 in FIG. 1B), fluid or gas can flow through the interior space 22, for example, from the first end to the second end of the inner shaft 4.

In some embodiments the second end of the inner shaft 4 can be capped in various ways if flow of fluid or gas out of the interior space 22 is not desired. For example, as shown in FIG. 5, a bleeder cap 8 can block the second end of the inner shaft 4. In one embodiment, the bleeder cap 8 can be threaded to match a corresponding thread on the second end of the outer shaft 3.

Figure 6A:
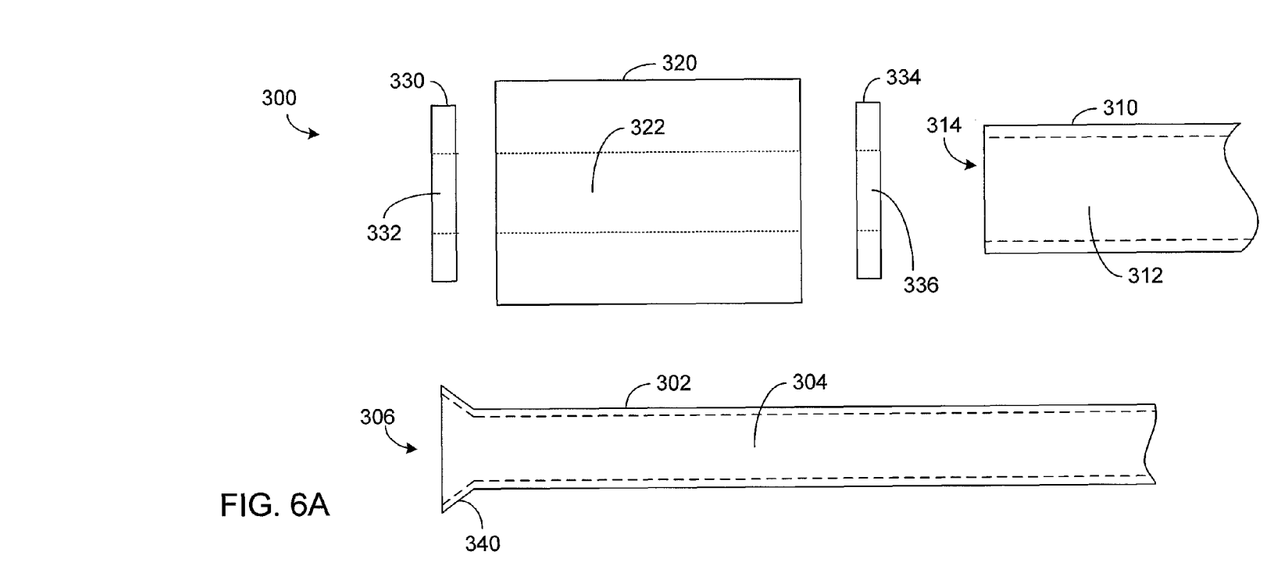
FIG. 6A shows an unassembled view of one embodiment of the plug end.
Figure 6B:
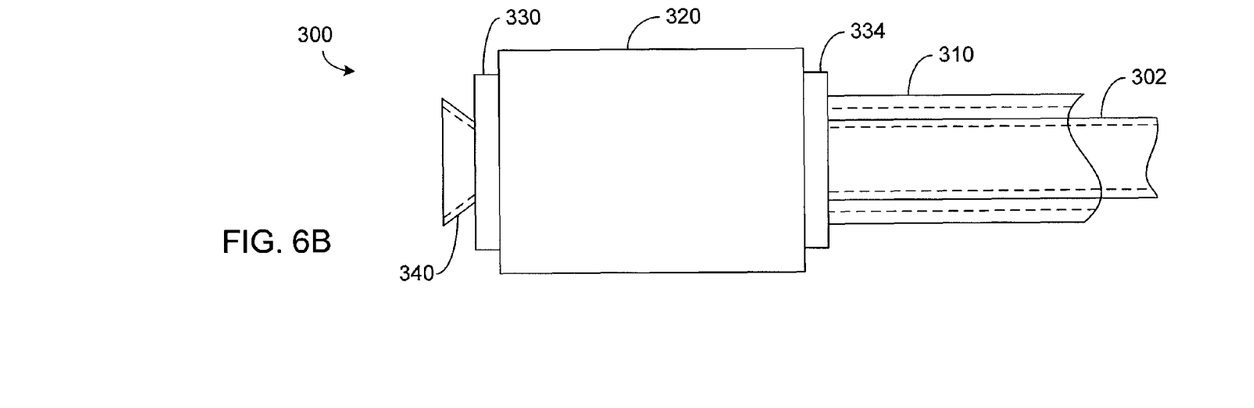
FIG. 6B shows an assembled view of the example plug assembly of FIG. 6A.
Figure 7A:
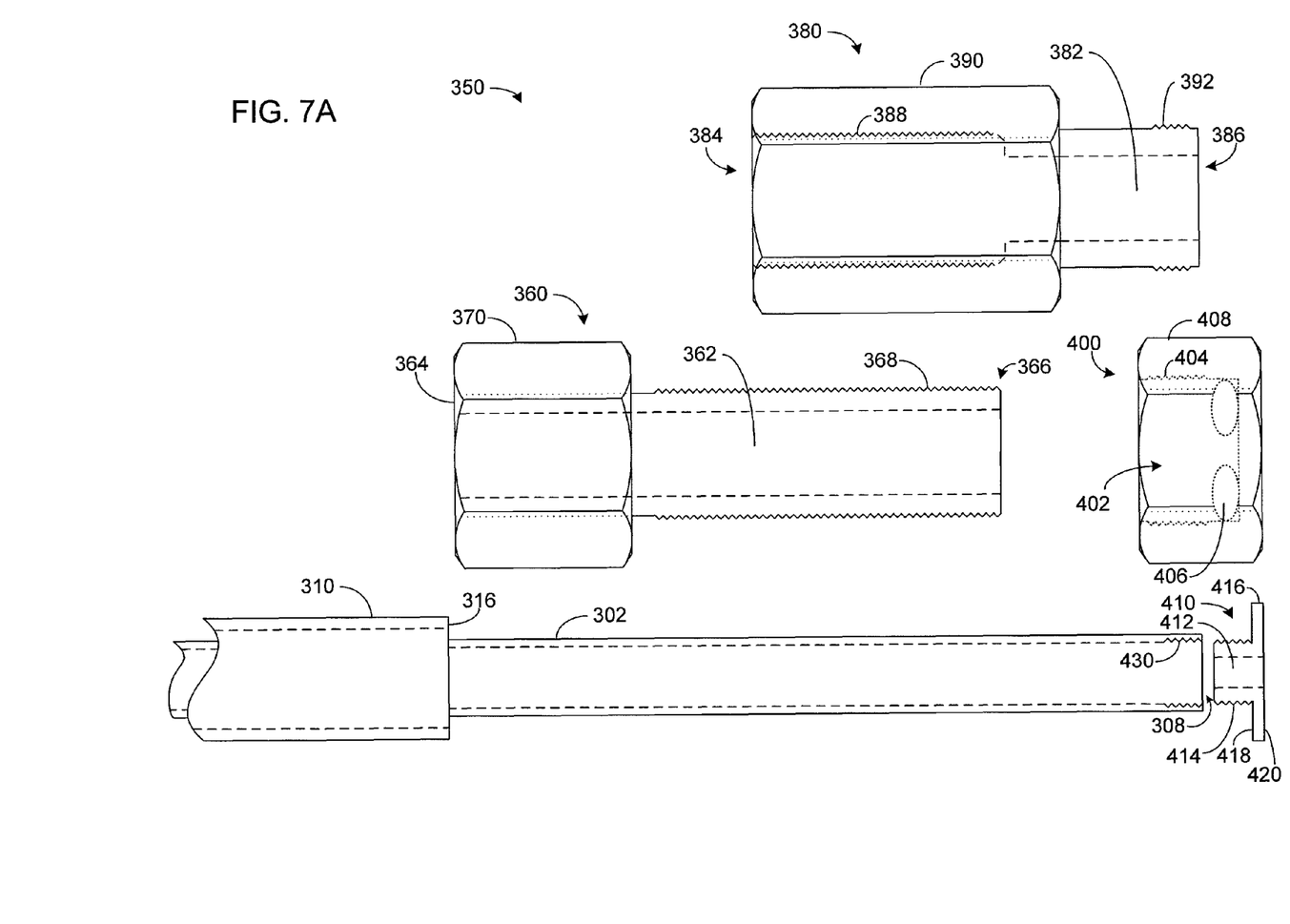
FIG. 7A shows an unassembled view of one embodiment of the cap end.
Figure 7B:
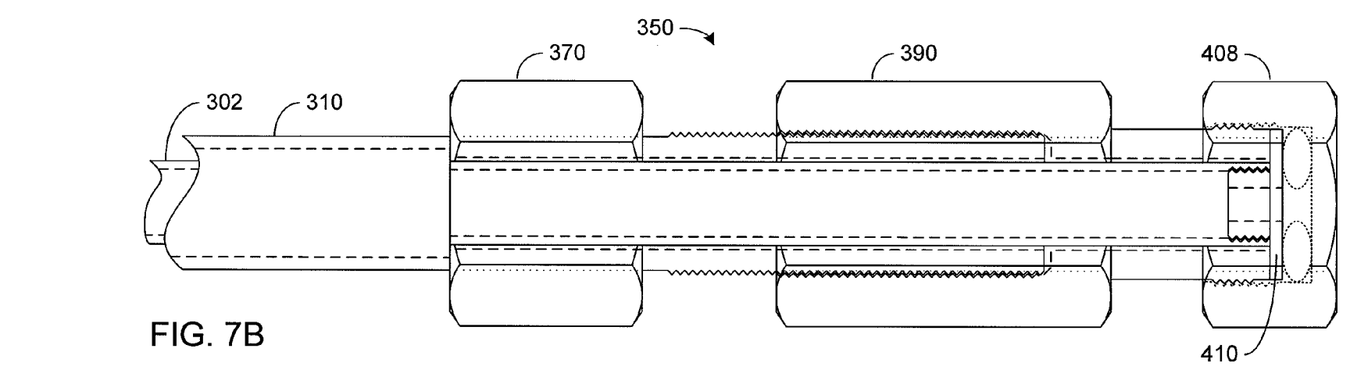
FIGS. 7B and 7C show assembled views of the example cap assembly of FIG. 7A.
Figure 7C:
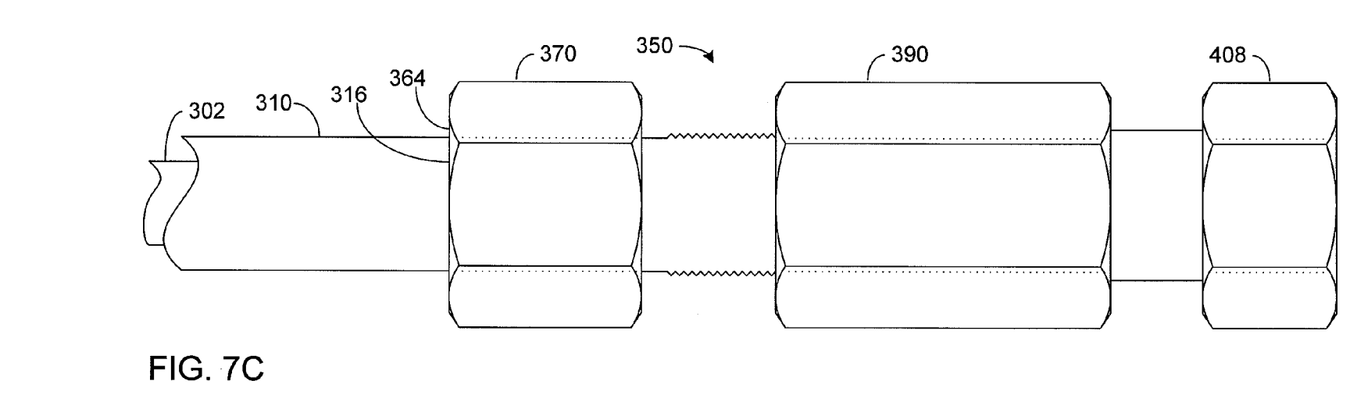

FIGS. 6 and 7 show various views of another example embodiment of the sealing device. FIG. 6A shows an unassembled view of the plug end assembly 300 of the sealing device. FIG. 6B shows an assembled view of the plug end assembly 300 of the sealing device. FIG. 7A shows an unassembled view of the cap end assembly of the sealing device. FIGS. 7B and 7C show assembled views of the cap end assembly of the sealing device.

Figure 8:
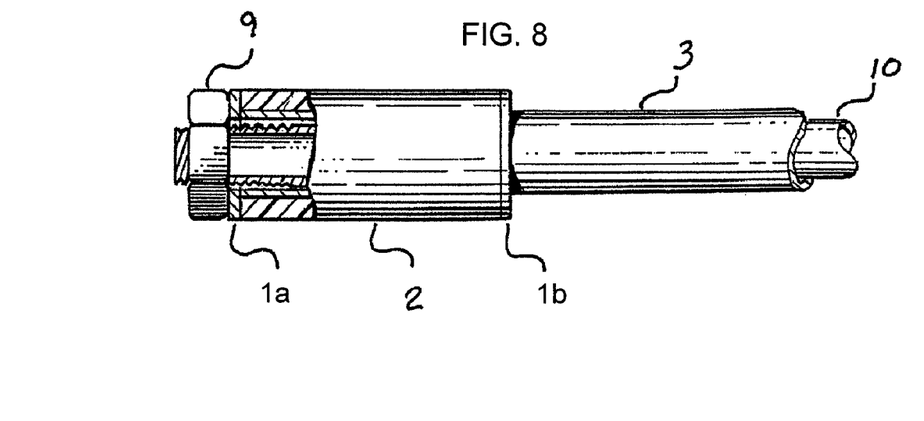
FIG. 8 shows another embodiment of the plug end of the sealing device.

In some embodiments, as shown in FIG. 6A, an inner shaft 302 can define a hollow pathway 304 to allow flow of fluids or gases between the shaft's first end 306 and second end (308 in FIG. 7A). As described herein, the first end 306 can be configured to block movement of the plug assembly past the first end 306. In some embodiments, the first end can define a flare 340 dimensioned to prevent longitudinal movement of the plug assembly past the first end 306. As described herein, the first end 306 can be configured in other ways (for example, via a nut as shown in FIG. 8) to provide similar functionality.

In some embodiments, as shown in FIG. 6A, a plug assembly can include laterally expandable member 320 interposed between first and second disks 330, 334, such that the expandable member 320 can expand laterally when squeezed longitudinally between the first and second disks 330, 334. For the purpose of description, it will be understood that longitudinal direction is generally along the axis of the inner shaft 302, and lateral direction is generally perpendicular to the longitudinal direction.

As shown in FIG. 6A, the first and second disks 330, 334, and the expandable member 320 can define respective apertures 332, 322, and 336 dimensioned to fit over the outer diameter of the inner shaft 302. In one embodiment, the aperture 322 of the expandable member 320 can be dimensioned to fit tightly so as to provide a seal between the expandable member 320 and the inner shaft 302 when the expandable member 320 is either expanded or in its unexpanded state. In one embodiment, the aperture 332 of the first disk 330 can be dimensioned to inhibit its movement beyond the flare 340. For example, the diameter of the aperture 332 can be made smaller than the outer diameter of the flare 340.

In some embodiments, the expandable member can be formed from resilient material that can be deformed (when squeezed, for example) and restored. Materials such as rubber can be used.

In some embodiments, an outer shaft 310 can be dimensioned to have a hollow interior 312 with an inner diameter selected to receive the inner shaft 302 and allow longitudinal sliding motion of the inner shaft 302 therein. As described herein, the outer shaft 310 can include a first end 314 that engages the second disk 334. Thus, when the first end 314 of the outer shaft 310 pushes longitudinally against the second disk 334, the expandable member 320 expands laterally, since the other end of the expandable member is captured by the first disk 330 (which in turn is inhibited from moving beyond the flare 340).

FIG. 6B shows the plug assembly mounted on the inner shaft 302. As shown, longitudinal movement of the plug assembly beyond the flare 340 is inhibited by the first disk 330. The first end (314) of the outer shaft 310 is shown to engage the second disk 334. Thus, when the outer shaft 310 moves longitudinally towards the first end (306) of the inner shaft 302, the expandable member 320 expands laterally to provide a seal on the outer region of the inner shaft 302. Examples of how the outer shaft 310 can be moved relative to the inner shaft 302 are described herein in greater detail.

In some embodiments, as shown in FIG. 7A, the outer shaft 310 can be dimensioned to be shorter than the inner shaft 302. Thus, when the first end (314) of the outer shaft 310 touches the second disk 334 of the plug assembly (FIG. 6B, for example), the second end 316 of the outer shaft 310 is positioned so as to allow positioning of a longitudinally expandable member 350 between the second end 316 of the outer shaft 310 and the second end 308 of the inner shaft 302.

In some embodiments, the expandable member 350 can include a screw 360 having a first end 364 and a second end 366. The shaft of the screw 360 and the head 370 are shown to define an aperture 360 that extends longitudinally and having a diameter dimensioned to fit over the outer diameter of the inner shaft 302. The shaft of the screw 360 is also shown to include threads that are configured to mate with receiving threads 388 of a nut 380.

As shown in FIG. 7A, the nut 380 is shown to include a head 390 and a shaft that includes a threaded portion 392. The receiving threaded portion 388 is dimensioned to receive the threaded portion 368 of the screw 360, and the interior space thus defined in the nut 380 continues as an aperture 382. Thus, when the threaded portion 368 is mated to the receiving threaded portion 388 of the nut 380 (via the first end 384 of the nut 380), the overall length of the screw/nut assembly can be adjusted by relative turning of the screw and the nut. For example, the overall length can be reduced by turning the screw thread into the nut; and the overall length can be increased by turning the screw thread out of the nut.

In some embodiments, the longitudinal length of thread 388 of the nut 380 can be selected to limit the inward travel of the screw 360. For example, the diameter of the threaded region 388 in the nut 380 is shown to be larger than the diameter of the aperture 382.

In some embodiments, as shown in FIG. 7A, the second end 308 of the inner shaft 302 can be configured to engage the second end 386 of the nut 380 and prevent longitudinal movement of the second end 386 beyond the second end 308 of the inner shaft 302. In some embodiments, such as the example shown in FIG. 5, the second end of the inner shaft can include a flare to capture the second end of the nut. In some embodiments, such as the example shown in FIG. 7A, the second end of the inner shaft 302 can include inner threads 430 dimensioned to receive threads 414 of a cap member 410.

In some embodiments, the cap member 410 can include a flange 416 whose diameter is larger than the inner diameter of the aperture 382 of the nut 380. Thus, when the cap member 410 is installed at the second end of the inner shaft 302, the flange 416 captures the nut 380 and prevents longitudinal movement of the second end 386 beyond the second end 308 of the inner shaft 302. In some embodiments, the diameter of the flange 416 is substantially same as the outer diameter of the shaft portion (adjacent the second end 386) of the nut 380. In such a configuration, removal and installation of the cap member 410 from/to the second end 308 of the inner shaft 302 can be made easier even when the screw 360 and nut 380 are installed. Moreover, in such a configuration, the external threads 392 can be engaged by a cap nut 400 without interference from the flange 416.

In some embodiments, the cap member 410 can be a solid piece so as to prevent flow out of the inner shaft 302. In some embodiments, such as the example shown in FIG. 7A, the cap member 410 can define an aperture 412 that allows flow to or from the interior 304 of inner shaft 302. In such embodiments, the flow can be capped by, for example, the cap nut 400. Other devices can also be attached in a similar manner as the cap nut 400 to provide functionalities such as measurements.

As shown in the example of FIG. 7A, the flange of the cap member 410 can include first and second surfaces 418, 420. When installed, the first surface 418 can engage the second end 386 of the nut 380 to prevent the nut 380 from moving beyond the second end 308 of the inner shaft 302. The second surface 420 can engage an example sealing O-ring 406 of the cap nut 400 when the cap nut 400 is coupled to the thread 392 of the nut 380.

In some embodiments, the cap nut 400 can define a receiving space 402 with threads 404 dimensioned to allow coupling with the threads 392 of the nut 380. The cap nut 400 can include a head 408 that facilitates tightening and removal. The O-ring 406 can be dimensioned to snugly fit in the receiving space 402 and engage the second surface 420 of the cap member 410.

FIGS. 7B and 7C show partial cutaway and solid views where the expandable member 350, cap member 410, and the cap nut 408 are installed about the second end of the inner shaft 302. As shown, the expandable member 350 is captured between the second end 316 of the outer shaft 310 and the cap member 410. Thus, when the screw head 370 and/or the nut head 390 are turned to so as to longitudinally expand the expandable member 350, the first end 364 of the screw 360 pushes against the second end 316 of the outer shaft 310. Because the other end of the expandable member 350 is captured by the cap member 410, the longitudinal expansion of the expandable member 350 results in the outer shaft compressing and laterally expanding the laterally expandable member 320 (FIG. 6B). In reverse, reducing the length of the longitudinally expandable member 350 results in the outer shaft 310 releasing pressure on the plug assembly, thereby reducing the lateral dimension of the laterally expandable member 320.

In some embodiments, the screw 360, the nut 380, the cap member 410, and the cap nut 400 can be formed from, for example, brass and/or stainless steel. Other materials can also be used. The example O-ring can be formed from, for example, rubber. Other materials can also be used.

As described above, the non-limiting example configurations of the first end of the inner shaft can include a flared end (4 in FIGS. 4, and 340 in FIGS. 6A and 6B). Other configurations are also possible.

By way of example, FIG. 8 shows that in one embodiment, the functionality of the flared end(s) can be replaced, for example, by a nut 9. For example, instead of the flare (20 in FIG. 4), the example nut 9 is shown to inhibit the movement of the first disk 1a. In the example shown in FIG. 8, an inner shaft 10 having the threaded end can accommodate the example nut 9. Other configurations are also possible.

As described herein, the second end of the shaft assembly can be fitted with the cap 114 and/or the gauge 118. Non-limiting examples of the cap are described above in reference to FIGS. 5 and 7. In some embodiments, the second end of the shaft assembly can be coupled to a device such as a gauge.

Figure 9:
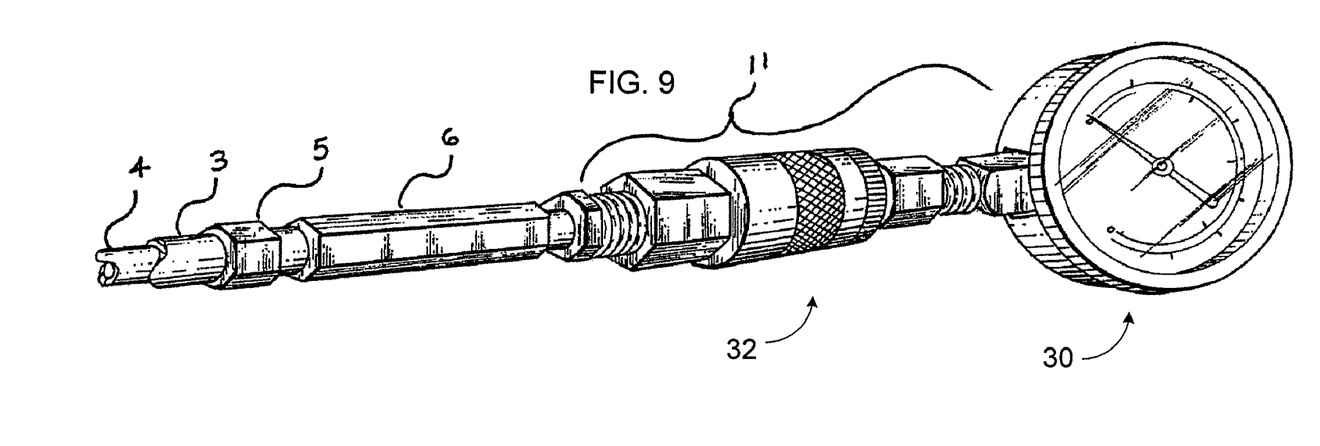
FIG. 9 shows that in one embodiment, the cap end of the sealing device can be coupled to a gauge configured to measure parameters such as pressure or temperature.

FIG. 9 shows an example embodiment where a gauge assembly 11 is on the second end of the shaft assembly. The gauge assembly 11 is shown to include a gauge 30 and a coupling assembly 32. The example gauge 30 can be selected to suit a given application. Similarly, the coupling assembly 32 can also be selected to suit that application.

In one embodiment, the gauge assembly 11 can be installed after removal of the example bleeder cap 8 (FIG. 5, for example). In one embodiment the coupling assembly 32 can function as both a cap and a receiver of the gauge 30. In one embodiment, such coupling assembly 32 can allow the gauge 30 to be removed and installed while the interior of the pipe or the orifice is pressurized.

Figure 10A:
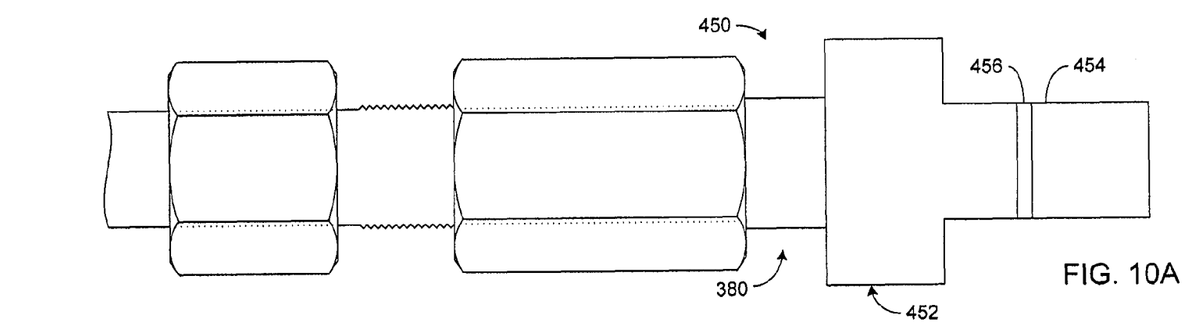
FIGS. 10A and 10B show example quick-detachable couplers that can be coupled to the cap end of the sealing device.
Figure 10B:
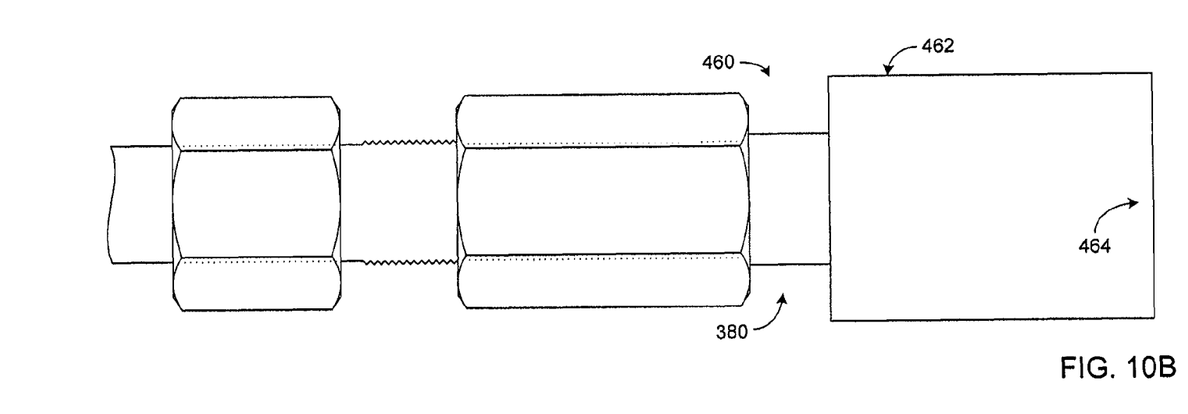

FIGS. 10A and 10B show that in some embodiments, various devices such as gauges and other attachments can be coupled to the cap end 380 of the sealing device by quick-detachable (QD) couplers. In some embodiments, as shown in FIG. 10A, a quick detach configuration 450 can include a QD coupler 452 coupled to the cap end 380 (for example, in a manner similar to that for attaching the cap nut 400 described above in reference to FIG. 7A). The example QD coupler 452 is shown to be male type having a coupling end 454 configured to facilitate coupling with corresponding female coupling portion of attachable devices (not shown). In some embodiments, the male coupling end 454 can be configured in compliance with on or more attachment standards. In some embodiments, the coupling end 454 can also include a sealing device 456 such as an O-ring.

In some embodiments, as shown in FIG. 10B, a quick detach configuration 460 can include a QD coupler 462 coupled to the cap end 380 (for example, in a manner similar to that for attaching the cap nut 400 described above in reference to FIG. 7A). The example QD coupler 462 is shown to be female type having a coupling end 464 configured to facilitate coupling with corresponding male coupling portion of attachable devices (not shown). In some embodiments, the female coupling end 464 can be configured in compliance with on or more attachment standards.

Figure 11:
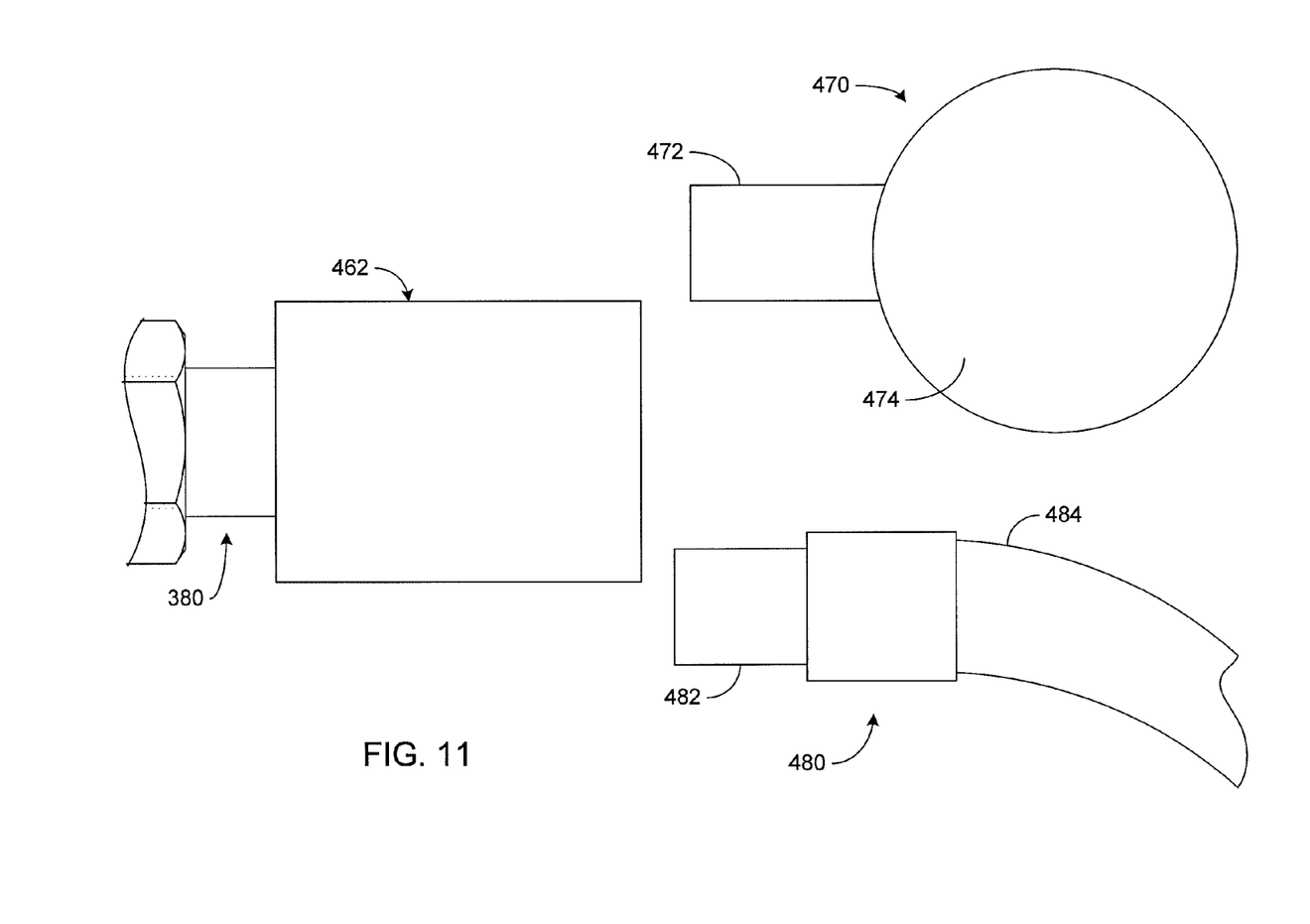
FIG. 11 shows example devices that can be coupled to the sealing device via the quick-detachable coupler of FIGS. 10A and 10B.

FIG. 11 shows some non-limiting examples of devices that can be coupled to the sealing device via the QD couplers described above in reference to FIGS. 10A and 10B. For the purpose of description of FIG. 11, the female QD coupler 462 is depicted. However, it will be understood that the male QD coupler can also be utilized. Moreover, as described herein, such devices can also be coupled to the sealing device using couplers that are not quick-detachable.

As shown, devices such as a gauge 470 can be attached to the sealing device via the QD coupler 462. The example gauge 470 can include a body 474 and a coupling end 472 (a male end in this example). The coupling end 472 can be configured to mate with the QD coupler 462.

As shown, devices such as a hose 480 can also be attached to the sealing device via the QD coupler 462. The example hose 480 can include a hose portion 484 and a coupling portion 482 (a male end in this example). The coupling portion 482 can be configured to mate with the QD coupler 462.

Figure 12A:
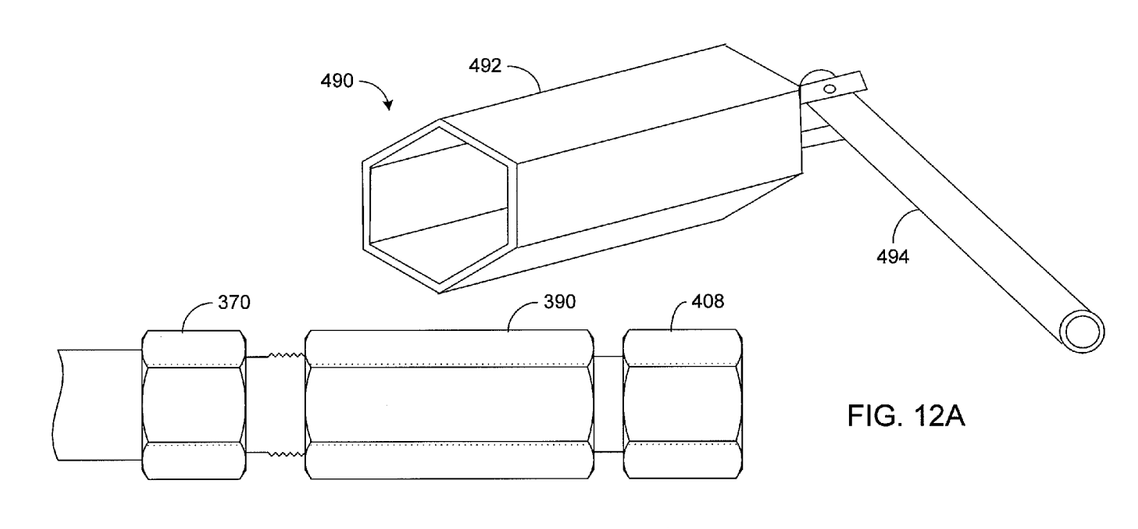
FIGS. 12A and 12B shows that in some embodiments, the expanding operation of the sealing device can be facilitated by a dedicated or a similar tool.
Figure 12B:
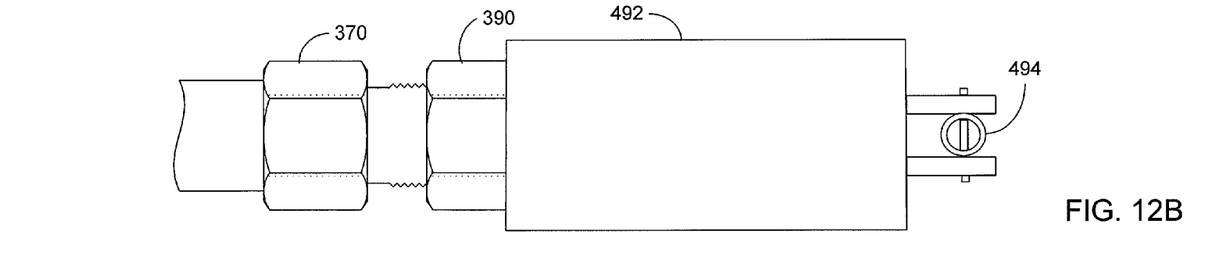

FIGS. 12A and 12B show an example of how the longitudinally expandable member (for example, as described above in reference to FIGS. 7A-7C) can be operated to facilitate lateral expansion and reduction of the plug assembly. In some embodiments, a handle assembly 490 can be configured to provide torque to at least one of the screw and nut heads 370, 390. In the example shown, the handle assembly 490 can include a socket 492 dimensioned to receive the nut head 390. The handle assembly 490 can also include a handle 490 coupled to the socket 492 so as to allow turning of the socket 492.

FIG. 12A shows the socket 492 removed from the nut head 390, and FIG. 12B shows the socket 492 receiving the nut head 390. In some embodiments, as shown in FIG. 12A, the head 408 of the cap nut can have similar lateral dimensions as that of the nut head 390. In the example described in reference to FIGS. 7A-7C, the cap nut (400) can couple directly to the nut (380). Thus, the cap nut head 408 can turn with the nut head 390 during the operation of the handle assembly 490, and the socket 492 can be of a simple design that accommodates both the cap nut head 408 and the nut head 390.

FIG. 12B shows that once the socket is on the nut head 390, the handle 494 can be turned relative to the screw head 370 (for example, by keeping the screw head 370 stationary with a wrench) to longitudinally expand or contract the longitudinally expandable member. The handle 494 can also be kept stationary while the screw head 370 is turned (for example, with a wrench). The handle 494 and the screw head 370 can also be turned simultaneously in the opposite direction.

A wide variety of variations are possible. For example, additional structural elements may be added, elements may be removed or elements may be arranged or configured differently. Similarly, processing steps may be added, removed, or ordered differently. Accordingly, although the above-disclosed embodiments have shown, described, and pointed out the novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A device, comprising:
a shaft assembly having first and second ends, and defining a hollow interior pathway between the first and second ends;
a plug assembly disposed adjacent the first end of the shaft assembly and comprising a laterally expandable member configured to expand laterally about a longitudinal axis of the shaft assembly when compressed longitudinally;
a longitudinal expansion assembly disposed adjacent the second end of the shaft assembly and configured to expand longitudinally;
a longitudinal coupling member disposed between the longitudinal assembly and the plug assembly such that when the longitudinal expansion assembly expands, longitudinal coupling member transfers a longitudinal force due to expansion to the plug assembly to provide the longitudinal compression for the laterally expandable member; and
a removable cap member disposed on the second end of the shaft assembly, the cap member including an aperture to allow passage of fluid or gas from or to the hollow interior pathway of the shaft assembly,
wherein the shaft assembly is configured to allow attachment of an end device to the longitudinal expansion assembly over the cap member, the cap member configured to engage the end device when the end device is attached to the longitudinal expansion assembly.

2. The device of claim 1, wherein the shaft assembly comprises a hollow tube having circular cross-sectional shape with an outer diameter and an inner diameter.

3. The device of claim 2, wherein the laterally expandable member comprises a cylindrically shaped member having a longitudinally extending aperture with a diameter selected to fit over the outer diameter of the hollow tube and provide sealing functionality between the hollow tube and the outer perimeter of the cylindrically shaped member.

4. The device of claim 3, wherein the plug assembly further comprises first and second disks disposed on first and second ends of the cylindrically shaped member, each of the first and second disks defining an aperture dimensioned to fit over the hollow tube and capture the cylindrically shaped member so as to facilitate compression of the cylindrically shaped member.

5. The device of claim 2, wherein the shaft assembly is configured to prevent longitudinal movement of the plug assembly beyond the first end of the shaft assembly.

6. The device of claim 5, wherein the shaft assembly defines a flare at or near its first end, the flare dimensioned to prevent the longitudinal movement of the plug assembly.

7. The device of claim 5, wherein the shaft assembly includes a removable nut mounted at or near the first end of the shaft assembly, the nut dimensioned to prevent the longitudinal movement of the plug assembly.

8. The device of claim 2, wherein the longitudinal expansion assembly is dimensioned to fit over the outer diameter of the hollow tube and between the longitudinal coupling member and a location at or near the second end of the hollow tube.

9. The device of claim 8, wherein the longitudinal expansion assembly comprises first and second members having respective longitudinally extending apertures with diameters selected to fit over the hollow tube, the first and second members configured to operate in cooperation to allow longitudinal expansion of the longitudinal expansion assembly.

10. The device of claim 9, wherein the first member includes a hollow shaft portion having external threads, and the second member includes hollow receiving portion having internal threads dimensioned to receive the external threads of the first member, such that relative rotation of the first and second members results in longitudinal expansion or contraction of the longitudinal expansion assembly.

11. The device of claim 10, wherein the first member comprises a screw.

12. The device of claim 11, wherein the screw includes a head dimensioned to be received by a wrench to facilitate the relative rotation of the first and second members.

13. The device of claim 12, wherein the head of the screw has a hexagonal cross-sectional shape.

14. The device of claim 10, wherein the second member comprises a nut.

15. The device of claim 14, wherein the nut includes a head dimensioned to be received by a wrench to facilitate the relative rotation of the first and second members.

16. The device of claim 15, wherein the head of the nut has a hexagonal cross-sectional shape.

17. The device of claim 2, wherein the shaft assembly is configured to prevent longitudinal movement of the longitudinal expansion assembly beyond the second end of the shaft assembly.

18. The device of claim 17, wherein the shaft assembly defines a flare at or near its second end, the flare dimensioned to prevent the longitudinal movement of the longitudinal expansion assembly.

19. The device of claim 17, wherein the cap member is dimensioned to prevent the longitudinal movement of the longitudinal expansion assembly.

20. The device of claim 19, wherein the second end of the hollow tube includes internal threads, and the cap member includes a threaded portion dimensioned to be received by the internal threads of the second end of the hollow tube, the cap member further comprising a flange having a diameter selected to prevent the longitudinal movement of the longitudinal expansion assembly.

21. The device of claim 20, wherein the flange has a diameter substantially the same as the outer diameter of the shaft assembly so as to allow removal of the cap member when the end device is not attached to the longitudinal expansion assembly.

22. The device of claim 20, wherein the flange diameter is selected so as to allow attachment of an end device to the longitudinal expansion assembly.

23. The device of claim 22, wherein the longitudinal expansion assembly includes a hollow shaft portion at or near the second end of the hollow tube, the hollow shaft portion having an outer diameter that is substantially the same as the flange diameter, the hollow shaft portion having external threads to allow attachment of the end device over the cap member.

24. The device of claim 23, wherein the end device comprises a cap nut having internal threads dimensioned to receive the external threads of the hollow shaft portion.

25. The device of claim 24, wherein the cap nut is dimensioned to allow positioning of an O-ring that engages the flange of the cap member to provide sealing of the interior of the hollow tube.

26. The device of claim 22, wherein the end device comprises a quick-detachable coupler that facilitates coupling to an external device.

27. The device of claim 26, wherein the quick-detachable coupler is configured to facilitate coupling of the external device to the longitudinal expansion assembly.

28. The device of claim 1, wherein the laterally expandable member is dimensioned and formed from a selected material so that when in its uncompressed state, the laterally expandable member is insertable into an interior of a pipe or an orifice, and when in its compressed state, the expanded dimension is such that the laterally expandable member provides a seal between the inner wall of the pipe or orifice and the shaft assembly.

29. The claim of claim 1, wherein the longitudinal coupling member comprises an outer hollow tube having an inner diameter that allows the outer hollow tube to fit over and move longitudinally relative to the shaft assembly.

30. An apparatus for controlling fluids or gases from pipes or orifices, comprising:
a plug member configured to expand and contract, wherein the plug member in the expanded configuration engages the interior of a pipe or orifice;
a shaft assembly configured to facilitate the expansion and contraction of the plug member, wherein the shaft assembly includes a conduit member defining a hollow interior and having first and second ends, such that the first end extends through the plug member so as to allow flow of fluid or gas from the first end to the second end even if the plug member is in the expanded configuration;
an expansion assembly disposed adjacent the second end of the conduit member and configured to facilitate the expansion and contraction of the plug member;
a removable cap member disposed on the second end of the shaft assembly, the cap member including an aperture to allow passage of fluid or gas from or to the hollow interior of the shaft assembly; and
an end assembly disposed at or about the second end of the conduit member and attached over the cap member to a portion of the expansion assembly, wherein the end assembly is configured to allow either capping of the second end to inhibit flow or attaching of a gauge for measuring at least one condition of the fluid or gas in the interior of the pipe or orifice.

* * * * *